(12) United States Patent
Berman (10) Patent No.: US 7,966,611 B2
(45) Date of Patent: Jun. 21, 2011

(54) DELAYED PRODUCTION EXPANSION BY USE OF MACROS

(75) Inventor: Steven M. Berman, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 1272 days.

(21) Appl. No.: 11/467,084

(22) Filed: Aug. 24, 2006

(65) Prior Publication Data

US 2008/0127074 A1    May 29, 2008

(51) Int. Cl.
*G06F 9/44* (2006.01)

(52) U.S. Cl. .................................. 717/162

(58) Field of Classification Search ........... 717/116, 717/120, 105, 114, 145, 154, 162, 168, 122
See application file for complete search history.

(56) References Cited

U.S. PATENT DOCUMENTS

| | | | |
|---|---|---|---|
| 5,872,977 A * | 2/1999 | Thompson | 717/122 |
| 6,487,713 B1 * | 11/2002 | Cohen et al. | 717/105 |
| 7,003,759 B2 | 2/2006 | Jameson | |
| 7,006,960 B2 | 2/2006 | Schaumont et al. | |
| 7,047,530 B2 | 5/2006 | Lu | |
| 2004/0139425 A1 * | 7/2004 | Zook | 717/120 |
| 2004/0194060 A1 | 9/2004 | Ousterhout et al. | |
| 2004/0221262 A1 | 11/2004 | Hampapuram et al. | |
| 2004/0226004 A1 | 11/2004 | Oldman | |
| 2005/0022155 A1 | 1/2005 | Broberg, III et al. | |
| 2005/0177818 A1 * | 8/2005 | Huene et al. | 717/116 |
| 2006/0064681 A1 | 3/2006 | Robinson | |

OTHER PUBLICATIONS

"GNU Make", Free Software Foundation, Apr. 2006, [online] [retrieved Aug. 18, 2006], http://www.gnu.org/software/make/manual/make.html.

* cited by examiner

*Primary Examiner* — Tuan Anh Vu
(74) *Attorney, Agent, or Firm* — Rabindranath Dutta; Konrad Raynes & Victor LLP (57) ABSTRACT

Provided are a method, system, and article of manufacture, wherein a rules file is maintained, wherein the rules file includes production rules that are defined by including macros. At least one makefile is maintained, wherein the at least one makefile is a file that is executable by a make utility to generate at least one target corresponding to a software component, and wherein the at least one makefile includes the rules file. An execution is initiated of the make utility on the at least one makefile with an instruction to generate the at least one target. At least one production rule including at least one macro included in the rules file is evaluated, in response to initiating the execution of the make utility on the at least one makefile. The at least one target is generated.

16 Claims, 9 Drawing Sheets

"Existing Makefile"

```
# Make the server and the client by default
all: server client

# Common definitions:
CDEFS = -DUNIX -DSOCKETS ifeq ($(OS_TYPE), SOLARIS)
Commands to link the server on SOLARIS
server: server.o common-stuff.o special.o
    ld -o server server.o common-stuff.o special.o -lm -lsocket -lnsl -lpthread

# Commands to link the client on SOLARIS
client: client.o common-stuff.o gui.o
    ld -o client server.o common-stuff.o gui.o -lsocket -lnsl -lpthread

# Commands to compile each C file
server.o: server.c
    cc -c -DSOLARIS $(CDEFS) -DSYSTEM_SIZE=2 -xarch=sparc server.c client.o: client.c
    cc -c -DSOLARIS $(CDEFS) -DSYSTEM_SIZE=2 -xarch=sparc client.c
common-stuff.o: common-stuff.c
    cc -c -DSOLARIS $(CDEFS) -DSYSTEM_SIZE=2 -xarch=sparc common-stuff.c gui.o: gui.c
    cc -c -DSOLARIS $(CDEFS) -DSYSTEM_SIZE=2 -xarch=sparc server.c
endif feq ($(OS_TYPE), AIX)
Commands to link the server on AIX
server: server.o common-stuff.o special.o
    ld -q32 -o server server.o common-stuff.o special.o -lm -lsocket -lnsl -lpthread

# Commands to link the client on AIX
client: client.o common-stuff.o gui.o
    ld -q32 -o client server.o common-stuff.o gui.o -lsocket -lnsl -lpthread

# Commands to compile each C file (AIX)
server.o: server.c
    xlC_r -c -qtbtable=full -qinfo=gen -DAIX $(CDEFS) -DSYSTEM_SIZE=2 server.c client.o: client.c
    xlC_r -c -qtbtable=full -qinfo=gen -DAIX $(CDEFS) -DSYSTEM_SIZE=2 client.c common-stuff.o: common-stuff.c
    xlC_r -c -qtbtable=full -qinfo=gen -DAIX $(CDEFS) -DSYSTEM_SIZE=2 common-stuff.c gui.o: gui.c
    xlC_r -c -qtbtable=full -qinfo=gen -DAIX $(CDEFS) -DSYSTEM_SIZE=2 server.c
endif
```

Makefile.rules:

Settings for compiler and linker for Solaris
SOLARIS_CC = cc
SOLARIS_LD = ld
SOLARIS_CFLAGS = -DSOLARIS -DSYSTEM_SIZE=2 -xarch=sparc
SOLARIS_LDFLAGS = -xildoff

Settings for compiler and linker for AIX
AIX_CC = xlC_r
AIX_LD = ld
AIX_CFLAGS = -qtbtable=full -qinfo=gen -DAIX
AIX_LDFLAGS = -q32

BLD_OBJS := $($(@F)_OBJS)

define compile-file
    $(CC) -c -o $(@) $($(OS_TYPE)_CFLAGS) $($(@F)_CFLAGS) $< define link-program
    $(LD) $($(OS_TYPE)_LDFLAGS) $($(@F)_LDFLAGS) -o $(@) $(BLD_OBJS) $($(@F)_LIBS) $($(@F)_SYSLIBS)

%.o:%.c
    $(compile-file)

%:$(%_OBJS)
    $(link-program)

programs: $(PROGRAMS)
-------------------------------------------------
End of Makefile.rules

FIG. 7

"New Makefile"
The following would be the entire contents of the component's Makefile:

PROGRAMS = client server client_OBJS = client.o common-stuff.o gui.o
client_CFLAGS = -DUNIX -DSOCKETS
client_LIBS = -lsocket -lnsl
client_SYSLIBS = -lpthread server_OBJS = server.o common-stuff.o special.o
server_CFLAGS = -DUNIX -DSOCKETS
server_LIBS = -lm -lsocket -lnsl
server_SYSLIBS = -lpthread .include Makefile.rules all: programs
--------------
End of component Makefile

DELAYED PRODUCTION EXPANSION BY USE OF MACROS

BACKGROUND

1. Field

The disclosure relates to a method, system, and article of manufacture for delayed production expansion by use of macros.

2. Background

Make is a generic name for a software utility that controls the generation of executables and other non-source files of a program from the program's source files. Make determines how to build a program from instructions stored in a file called the makefile. When source code for a software package is written, one or more makefiles for the software package may also be written, so that it is possible to use make to build and install the software package.

Make enables a user to build and install a software package without knowing the details of how the software package is being built and installed. Make automatically determines which files need to updated, based on which source files have changed. Make may also determine the appropriate order for updating files, in case one non-source file depends on another non-source file.

One or more rules included in a makefile may allow make to execute a series of commands in order to build a target file from source files. Rules may also specify a list of dependencies of the target file.

There are many different variations of make. Further details of one variation of make, referred to as "GNU Make" may be found in the publication "GNU Make" by Richard M. Stallman, et. al., Free Software Foundation, Inc., April 2006.

SUMMARY OF THE DESCRIBED EMBODIMENTS

Provided are a method, system, and article of manufacture, wherein a rules file is maintained, wherein the rules file includes production rules that are defined by including macros. At least one makefile is maintained, wherein the at least one makefile is a file that is executable by a make utility to generate at least one target corresponding to a software component, and wherein the at least one makefile includes the rules file. An execution is initiated of the make utility on the at least one makefile with an instruction to generate the at least one target. At least one production rule including at least one macro included in the rules file is evaluated, in response to initiating the execution of the make utility on the at least one makefile. The at least one target is generated.

In additional embodiments, the same rules file is included in each makefile of a plurality of makefiles, wherein each makefile of the plurality of makefiles is included in a separate directory, and wherein each makefile when executed by the make utility generates a component of a product.

In further embodiments, the at least one makefile is a first makefile, wherein a second makefile also includes the rules file, and wherein at least one variable is included in a definition of the at least one macro in the rules file. A first value is set to the at least one variable in the first makefile. A second value is set to the at least one variable in a second makefile, wherein invocations of the make utility on the first and the second makefiles result in different executions.

In yet further embodiments, the at least one makefile includes fewer instructions than an equivalent makefile that does not include the rules file.

In additional embodiments, the at least one makefile is a new makefile, wherein an existing makefile that stores production rules, path names and file lists in a variable space of the existing makefile is substituted in a software system by the rules file and the new makefile, wherein the rules file stores rules and the macros, and wherein the file lists and path names are assigned to variables in the new makefile.

BRIEF DESCRIPTION OF THE DRAWINGS

Referring now to the drawings in which like reference numbers represent corresponding parts throughout:

FIG. 6, illustrates an existing makefile that may be substituted by a rules file and a new makefile, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Many software products are built via automatic means by using a version of make, such as, Unix* make or GNU Make. Make utilizes a specific language that allows the expression of file names for the software source components, the intermediate production results, the final executable images and other component products of a software product. The language also provides a means to express dependencies between source files, intermediate production results, and final target objects such as executable images. The primary purpose of the make utility is to relieve the software developer or user of the need to know the specific sequence of commands necessary to build or install the software product out of the original, human-readable source files of the software product. A software product may include a makefile in each source code directory, and each makefile may include instructions corresponding to the steps necessary to build the software sources included in that source code directory. The make utility interprets the makefile and evaluates the relative freshness of the produced files versus the source files. Certain makefiles may include a production rule line for each source file that may have to be processed to create a component object. Typically, crafting the makefile may require duplication of text for every source file that is to be processed in a similar manner. Makefiles that direct the actions of a make utility may include a comprehensive enumeration of all commands needed to produce the software component. Additionally, with certain uses of make, changing a specific command to execute a production may require making the same change to every similar production line in every makefile in the entire source tree.

*UNIX is a trademark or registered trademark of The Open Group.

Certain embodiments allow using the features of the make utility such that the size and complexity of all the constituent makefiles for a software product are substantially reduced. Furthermore, the likelihood of a programmer committing an error while making a change in the production rules is similarly reduced. Certain embodiments use macros to define the production rules themselves, instead of allowing production rules to be statically defined. In addition, certain embodiments allow a rule defined by a macro containing variables to enjoy delayed evaluation with the make utility providing final evaluation of the actual production procedures only at runtime.

In certain embodiments, makefiles which direct the actions of the make utility do not have to be crafted out of comprehensive listings of every command needed to produce the software package. Instead, the use of multiple macro definitions allows all similar productions to be automatically generated by macro expansion when the make utility performs variable evaluation during runtime. In addition, individual productions do not have to be listed in a component directory's makefile. All the production rules and macro definitions can be isolated in a file referred to as a "rules file". The rules file is included by reference in the makefiles of the component directories.

The use of macros to express production rules in the rules file allows a change of a single line in a single rules file to effect the global modification to the production rule for all similarly handled sources files. As a result, a plurality of makefiles throughout the source tree may not have to be modified.

Exemplary Embodiments

Figure 1:
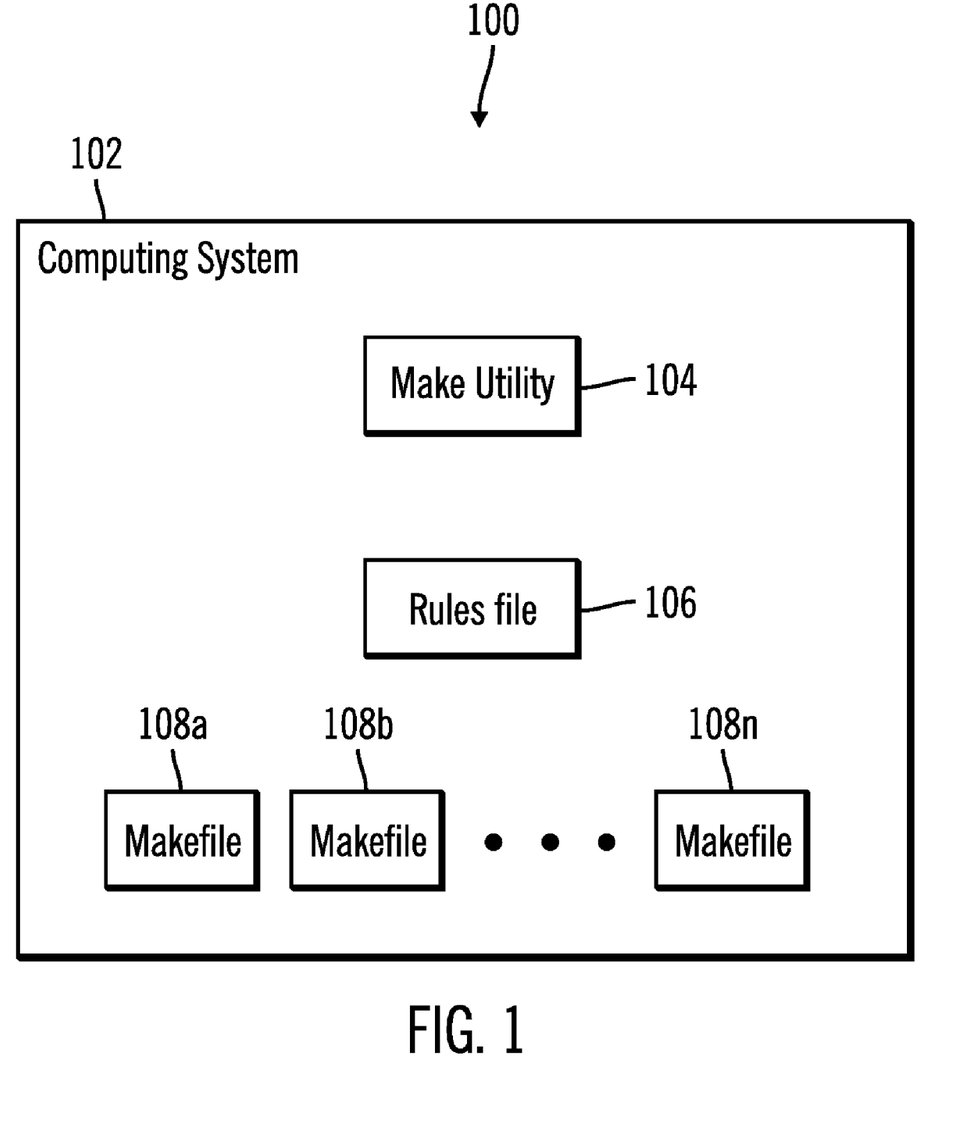
FIG. 1 illustrates a block diagram of a computing environment in accordance with certain embodiments.

FIG. 1 illustrates a block diagram of a computing environment 100 in accordance with certain embodiments. The computing environment 100 includes at least one computing system 102 that may optionally be coupled to a network. The computing system 102 may comprise any suitable computational device, including those presently known in the art, such as, a personal computer, a workstation, a mainframe, a midrange computer, a network appliance, a palm top computer, a telephony device, a blade computer, a hand held computer, etc.

The computing system 102 includes a make utility 104, at least one rules file 106, and a plurality of makefiles 108a, 108b, . . . 108n. The make utility 104 may comprise any version of a make utility, such as GNU Make. The rules file 106 is a shared file in which production rules are defined by using macros. A production rule is an expression in the make utility that when evaluated directs the execution of commands by the system which result in the creation of certain target files from certain dependent source files. By inclusion of the rules file 106, repetition of the text entry of rules may be avoided in the plurality of makefiles 108a . . . 108n. Files processed by the make utility may include variables and macros. A variable is a name that is defined in a file to represent a string of text, called the variable's value, where the values may be substituted by explicit requests into targets, prerequisites, commands, and other elements. A macro is name that is defined in a file to represent a list of commands that may be executed when the macro is invoked.

The makefiles 108a . . . 108n may be used to build various components of a software package. In certain embodiments, each of the makefiles 108a . . . 108n is a file of expressions evaluated by the make utility 104 to generate at least one target corresponding to a software component of a software package. In certain embodiments, a plurality of the makefiles 108a . . . 108n may include a reference to the rules file 106 for inclusion of the rules 106 within the makefiles 108a . . . 108n.

Therefore, FIG. 1 illustrates certain embodiments, in which a single rules file 106 uses macros to express production rules. A change of a single line in the single rules file 106 allows the global modification to the corresponding production rule for all similarly handled sources files without making any changes to the plurality of makefiles 108a . . . 108n.

Figure 2:
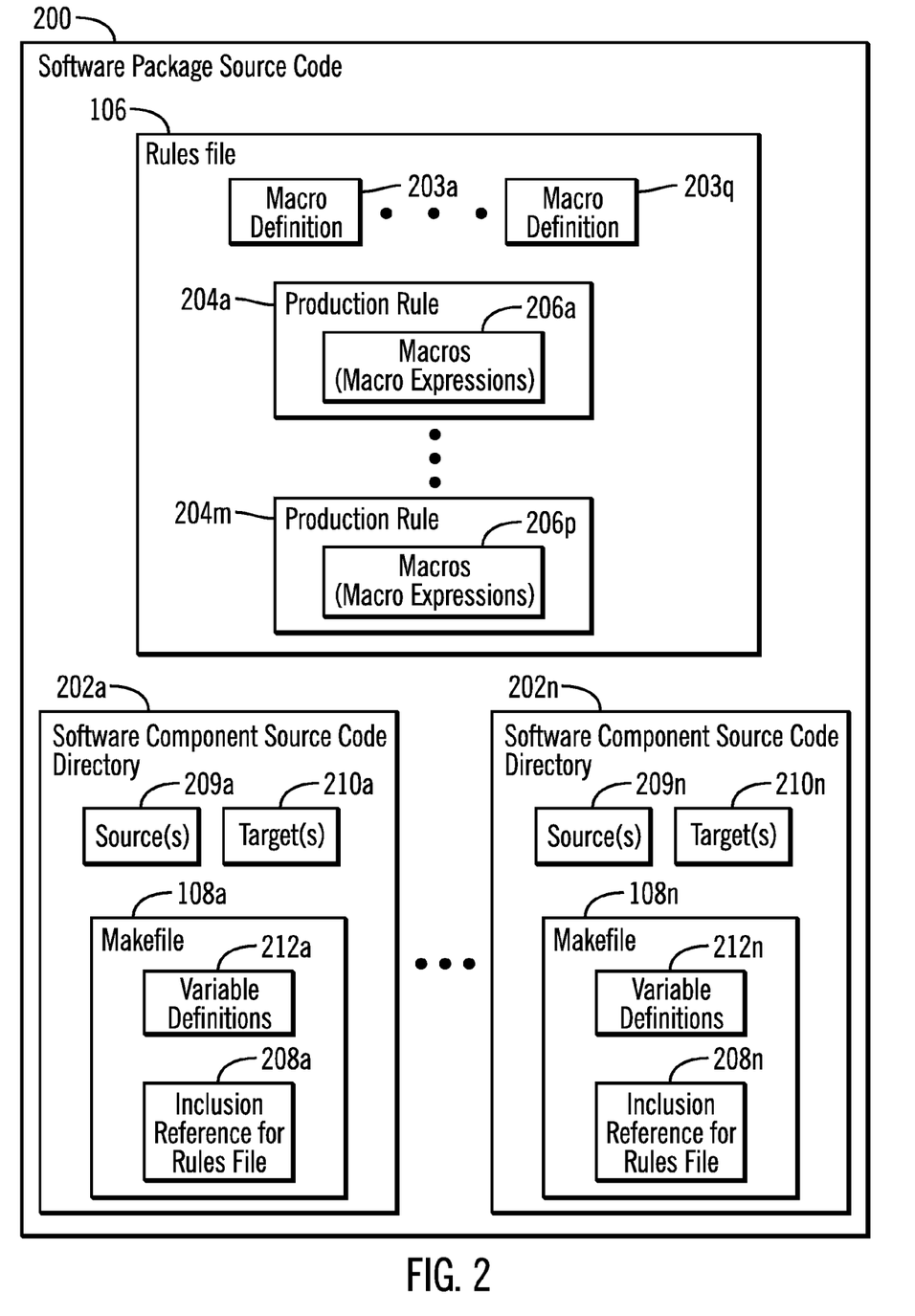
FIG. 2 illustrates a block diagram of a layout of source code in a software package, in accordance with certain embodiments.

FIG. 2 illustrates a block diagram of a layout of source code in a software package in the computing environment 100, in accordance with certain embodiments.

A software package source code 200 may include a plurality of software component source code directories 202a . . . 202n. A single rules file 106 included in the software package source code 200 includes a plurality of macro definitions 203a . . . 203q and a plurality of production rules 204a . . . 204m that uses a plurality of macro expressions 206a . . . 206p to express the productions.

The software component source code directories 202a . . . 202n also contain makefiles 108a . . . 108n respectively. The makefiles 108a . . . 108n include the rules file 106 via references 208a . . . 208n. When the make utility 104 interprets the makefiles 108a . . . 108n, the targets 210a . . . 210n may be generated in the corresponding software component source code directories 202a . . . 202n or in other directories as dictated by the production rules 204a . . . 204m.

Therefore, FIG. 2 illustrates certain embodiments in which a single rules file 106 includes one or more production rules 204a . . . 204m that use macros 206a . . . 206p. When instructions in a makefile, such as makefile 108a, are interpreted by the make utility 104, the production rules 204a . . . 204m may be executed if necessary and the targets 210a . . . 210n are generated from sources 209a . . . 209n, where the sources 209a . . . 209n are source files. For example, the target 210a may be generated from the source 209a when instructions in the makefile 108a are interpreted by the make utility 104. When a production rule needs to be changed, the production rule can be changed in the rules file 106 without changing any of the makefiles 108a . . . 108n. In certain embodiments, variable definitions 212a . . . 212n in the makefile 108a may activate production rules 204a . . . 204m, The activation of the production rules 204a . . . 204m in combination with the variable definitions 212a . . . 212n may determine the rules that are to be utilized to create the targets 210a.

Figure 3:
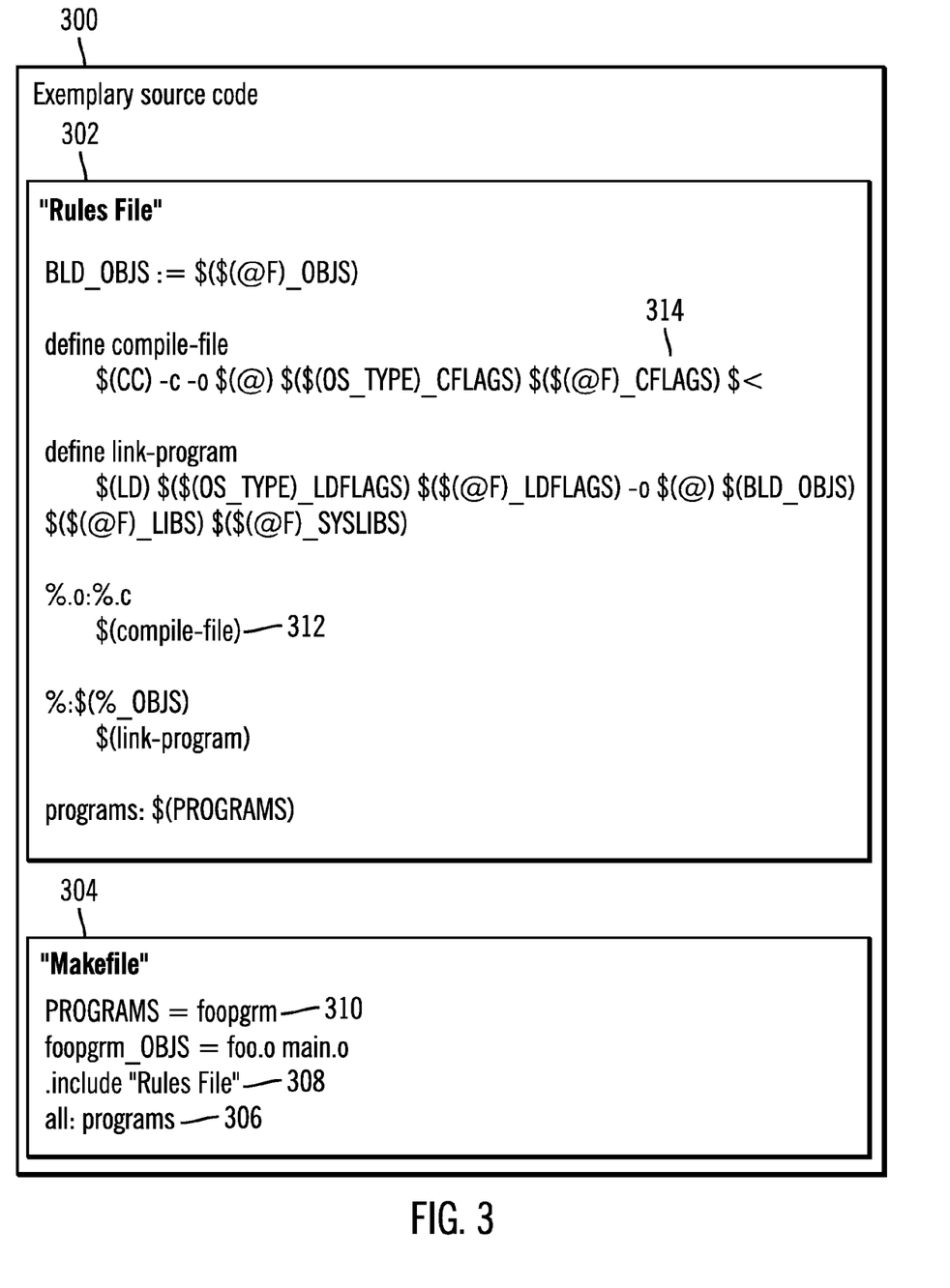
FIG. 3 illustrates an exemplary source code corresponding to a rules file and a makefile, in accordance with certain embodiments.

FIG. 3 illustrates an exemplary source code 300 corresponding to a rules file 302 and a makefile 304, in accordance with certain embodiments. The rules file 302 and the makefile 304 have been written using pseudocode syntax similar to that of the GNU Make utility. In certain embodiments, the makefile 304 may correspond to the makefile 108a shown in FIG. 2 and the rules file 302 may correspond to the rules file 106 shown in FIG. 2.

When the make utility 104 executes the makefile 304 to "make all" (reference numeral 306), the make utility 104 stores the value "foopgrm" in variable PROGRAMS (reference numeral 310) and the make utility 104 interprets the production rules included in the rules file 302 because the rules file 302 has been included (reference numeral 308) in the makefile 304. Exemplary production rules, such as exemplary production rule 312 directly or indirectly use macros 314, where the variables "$(@F)" and "$(@)" are built in variables in the make utility 104 and other variables such as "$($(@F)_CFLAGS)" "$($(OS_TYPE)_CFLAGS)" are constructed variable names which when used in the context of macros evaluate to specific variables whose names may include the name of a current target or the value of a variable defined in the makefile 304. Therefore FIG. 3 illustrates certain embodiments, in which a rules file 302 uses macros to express production rules. A change of a single line in the rules file 302 allows the global modification to the corresponding production rule without making any changes to the makefile 304. Therefore, the specific instantiation of the production rules for individual makefile 304 is automatically generated by the make utility 104 during the interpretation of the makefile 304 by the make utility 104. Production rules are dynamically instituted to produce the target "programs" 306 out of the sources, initiated by the use of the macro definitions and variable assignments alone.

Figure 4:
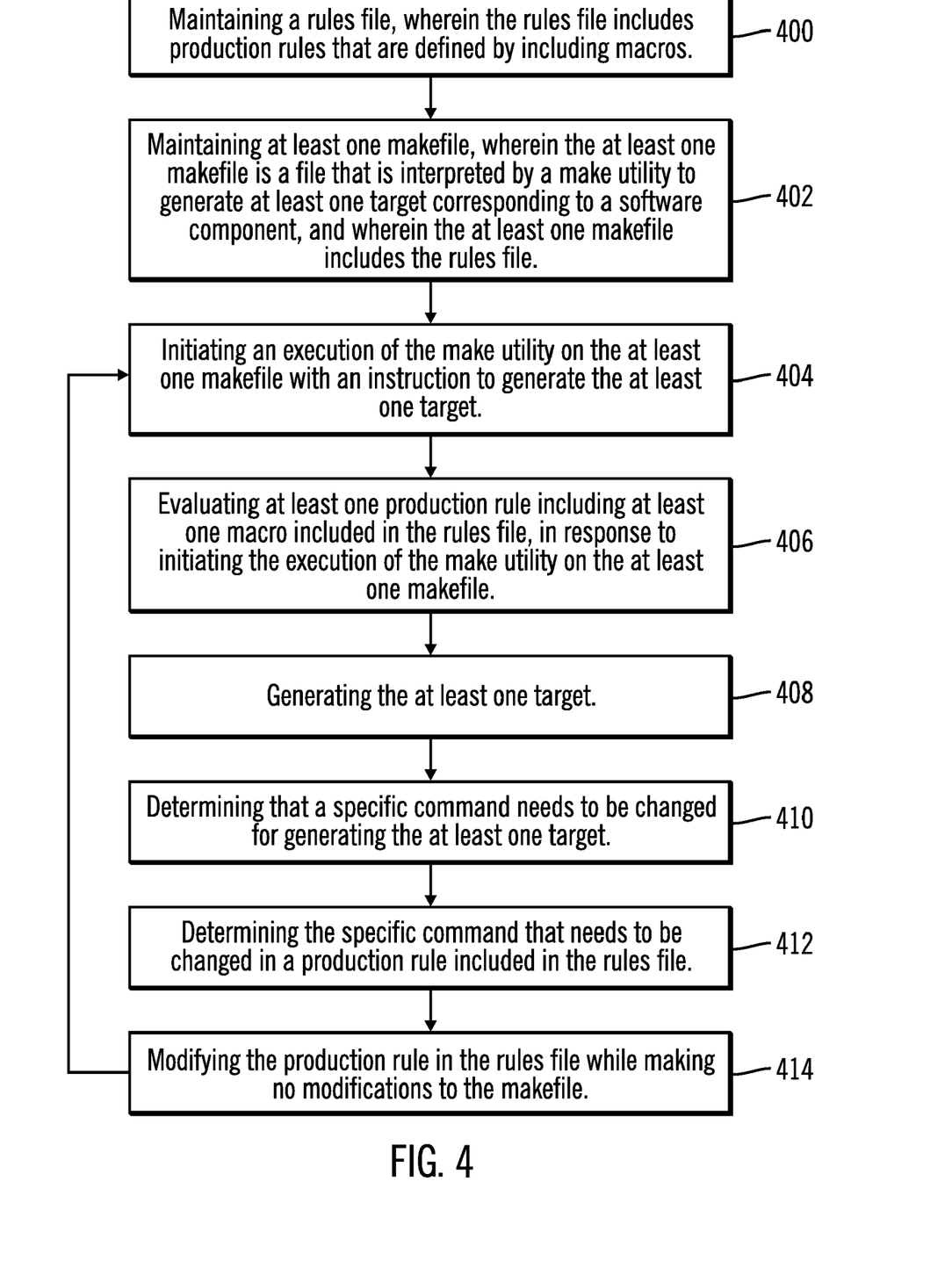
FIG. 4 illustrates a flowchart that shows a first set of operations for delayed production expansion by use of macros, in accordance with certain embodiments.

FIG. 4 illustrates a flowchart that shows a first set of operations for delayed production expansion by use of macros, in accordance with certain embodiments. The operations illustrated in FIG. 4 may be implemented in the computing environment 100 within the computing system 102.

Control starts at block 400, where a rules files 106 is maintained, and the rules file includes macro definitions 203a . . . 203q. The rules file 106 also contains production rules 204a . . . 204m that are defined by using macros 206a . . . 206p which were defined earlier. At least one makefile 108a is maintained (at block 402), wherein the at least one makefile 108a is a file of expressions interpreted by the make utility 104 to generate at least one target 210a corresponding to a software component, and wherein the at least one makefile 108a includes the rules file 106. The inclusion of the rules file 106 in the makefile 108a may be via a reference to an include directive in conformance with the syntax of the make utility 104.

An execution of the make utility 104 is initiated (at block 404) on the at least one makefile 108a with an instruction to generate the at least one target 210a. At least one production rule 204a using at least one macro 206a included in the rules file 106 is evaluated (at block 406), in response to initiating the execution of the make 104 on the at least one makefile 108. Control proceeds to block 408, where the at least one target 210a is generated by executing the commands in the expanded macro expression after variable evaluation by the make utility 104.

After the elapse of a certain period of time, a determination may be made (at block 410) that a specific command needs to be changed for generating the at least one target 210a. A determination is made (at block 412) of the specific command that needs to be changed in a production rule 204a . . . 204m included in the rules file 106. The production rule is modified in the rules file 106 while making no modifications to the makefile or makefiles 108a . . . 108n and control returns to block 404.

Therefore, FIG. 4 illustrates certain embodiments in which delayed production expansion by use of macros takes place at block 406, and a change of a production rule in the rules file 106 at block 414 can be made without any modifications to the makefiles 108a . . . 108n. Certain embodiments, also allow another software component to be added to a software package by defining another makefile in a new directory while using the same rules file.

Figure 5:
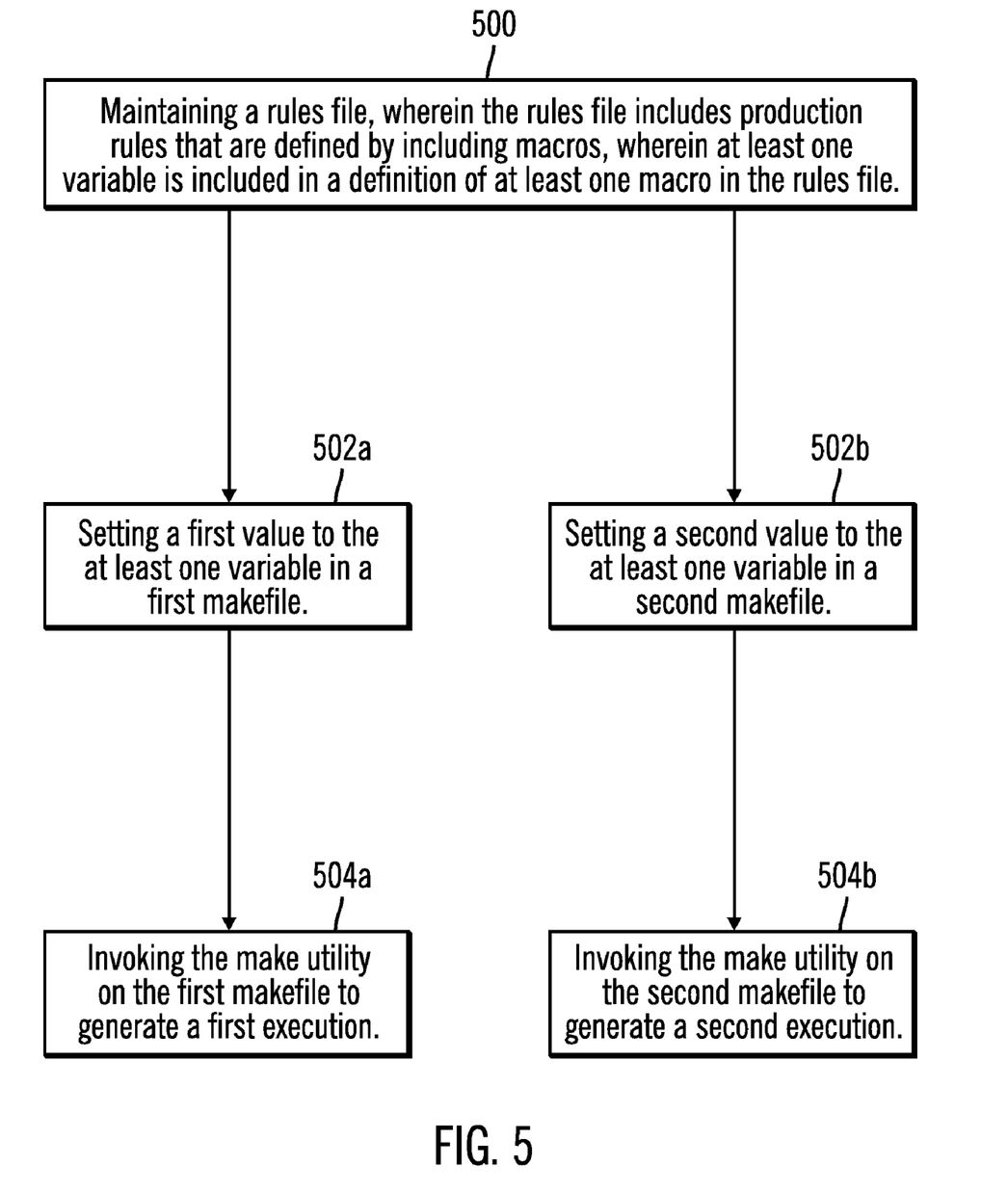
FIG. 5 illustrates a flowchart that shows a second set of operations for delayed production expansion by use of macros, in accordance with certain embodiments.

FIG. 5 illustrates a flowchart that shows a second set of operations for delayed production expansion by use of macros, in accordance with certain embodiments. The operations illustrated in FIG. 4 may be implemented in the computing environment 100 within the computing system 102.

Control starts at block 500, where a rules file 106 is maintained, wherein the rules file 106 includes production rules 204a . . . 204m that are defined by including macros 206a . . . 206p, and wherein at least one variable is included in a macro definition 203a . . . 203q of at least one macro in the rules file 106.

From block 500, control can proceed in parallel to blocks 502a and 502b. In block 502a, a first value is set via a variable definition 212a to the at least one variable in a first makefile 108a and in block 502b a second value is set via a variable definition 212n to the at least one variable in a second makefile 108n.

From block 502a control proceeds to block 504a where the make utility 104 is invoked on the first makefile 108a to generate a first execution. From block 502b control proceeds to block 504b where the make utility 104 is invoked on the second makefile 108n to generate a second execution. The first execution and the second execution are different and produce different results. For example, the first execution may produce the target 210a, whereas the second execution may produce the target 210n.

Therefore, FIG. 5 illustrates certain embodiments in which different results are produced by different settings to the same variable in different makefiles when the same rules file is included in the different makefiles, wherein the rules file includes the variable in a definition of at least one macro.

In certain embodiments, the same rules file 106 is included in each makefile of a plurality of makefiles 108a . . . 108n, wherein each makefile of the plurality of makefiles 108a . . . 108n is included in a separate directory, and wherein each makefile when executed by the make utility 104 generates a component of a product, where the product could be a software package or an application having a plurality of components.

FIG. 6, illustrates an existing makefile that may be substituted by a rules file and simpler new makefile, in accordance with certain embodiments. The makefile shown in FIG. 6 may be used in legacy systems where the embodiments illustrated in the invention have not been implemented. In such a system, the existing makefile illustrated in FIG. 6 builds several programs in a single directory of source files.

Figure 7:
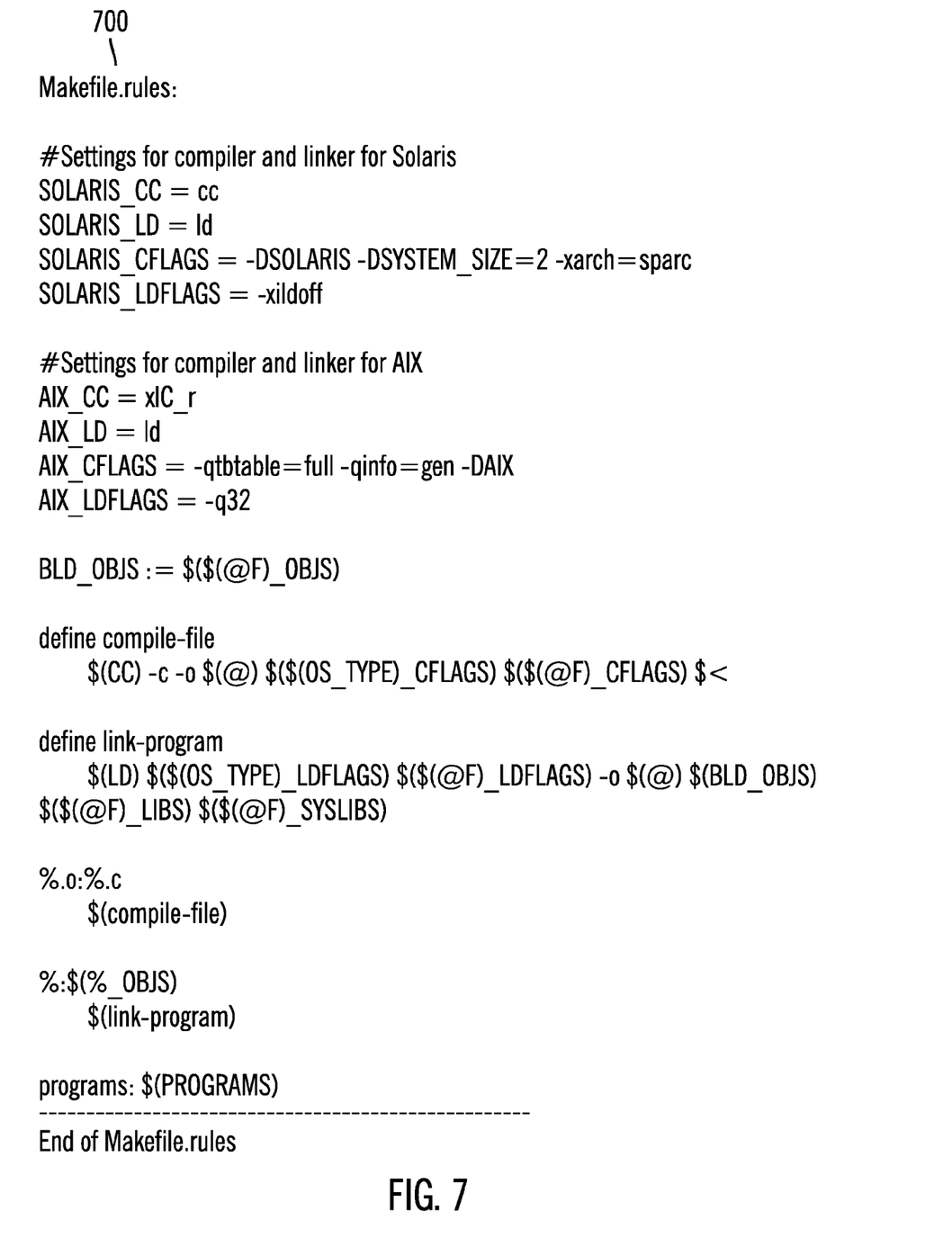
FIG. 7 illustrates a rules file corresponding to the existing makefile of FIG. 6, in accordance with certain embodiments.

FIG. 7 illustrates a rules file corresponding to the existing makefile of FIG. 6, in accordance with certain embodiments. The Makefile.rules file 700 shown in FIG. 6 is a rules file 106 that incorporates the common productions and the platform specific steps of the existing makefile of FIG. 6. Macros have been used in production rules shown in FIG. 6.

Figure 8:
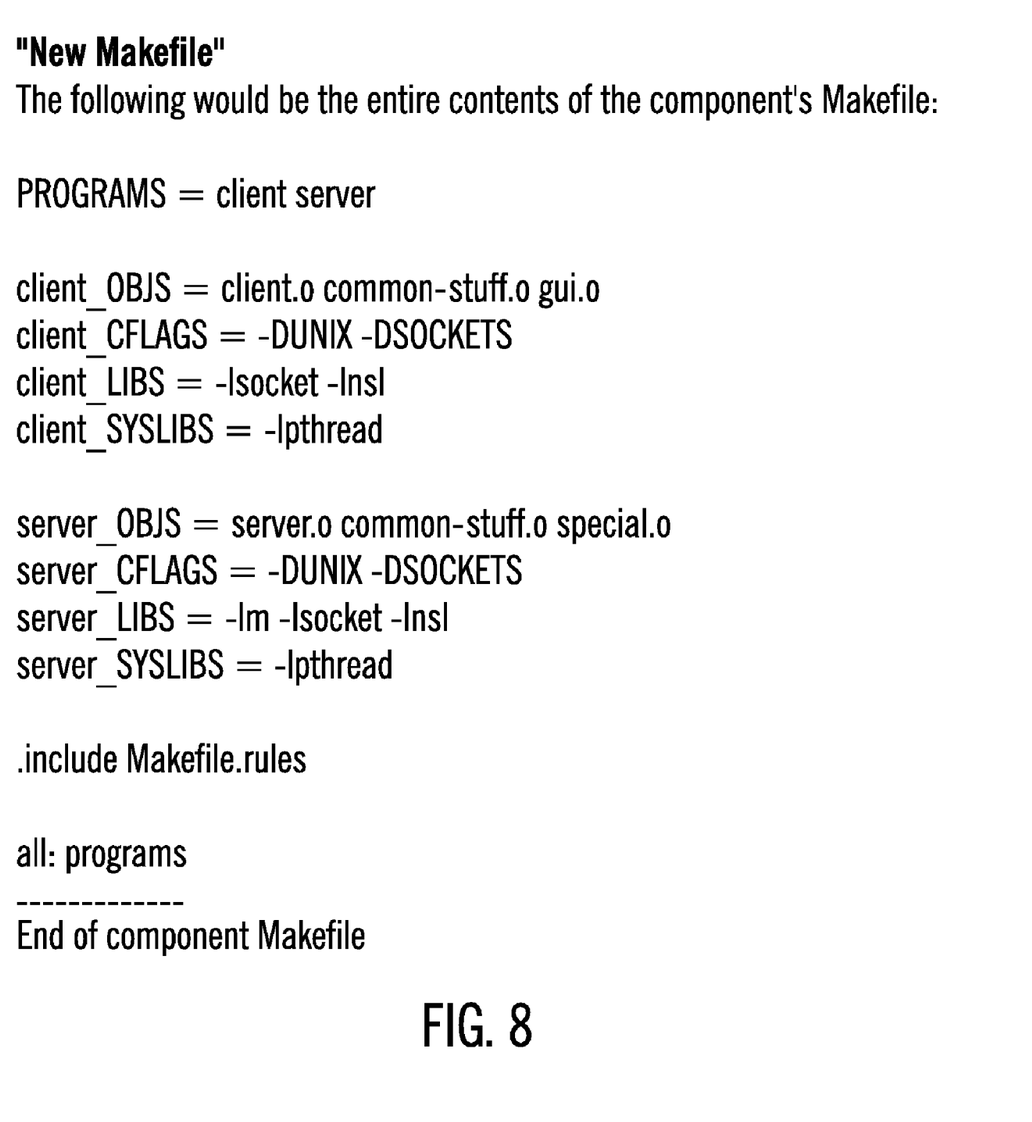
FIG. 8 illustrates a new makefile corresponding to the existing makefile of FIG. 6, wherein the new makefile is used in combination with the rules files of FIG. 7, in accordance with certain embodiments.

FIG. 8 illustrates a new makefile corresponding to the existing makefile of FIG. 6, wherein the new makefile is used in combination with the Makefile.rules file 700 of FIG. 7, in accordance with certain embodiments. The "Makefile" shown in FIG. 8 is platform independent as it does not include any directives pertaining to specific computing platforms. The platform specific directives are included in the Makefile.rules file 700 and are embodied in the variable assignments at the beginning of the file. Therefore, the common rules files and the makefile illustrated in FIG. 7 and FIG. 8 allow macro definitions to be uniquely expanded at make run time for each operating system platform on which a software product is built. The same makefile can be used with the source of the software product to build the different binary images for different operating platforms, such as Solaris*, AIX* etc.

*Solaris is trademark or registered trademark of Sun Microsystems, Inc.
*AIX is a trademark or registered trademark of International Business Machines Corp.

Certain embodiments, contain macro expression definitions. The macro expressions may execute shell commands as part of a make production. By using the macro definition as the sole contents of a make production, the evaluation of all variables in a macro may be deferred until all the input make files and rules files have been read in and parsed. This delays the evaluation of source and target file path names, as well as any other variables that can be used in the production steps. This use of macro definition capability allows certain embodiments to maintain a file of generic make rules that can be applied to any collection of source files. The reduction of the make rules into patterns and definitions means that fewer rules are read into the make utility and the building of a software product is relatively more efficient and more flexible as platform specific directives are captured in variable definitions alone, not in separate make files or separate make rules files.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drive, floppy disk, tape, etc.), optical storage (CD-ROM, optical disk, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in certain operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital video disk (DVD).

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 9:
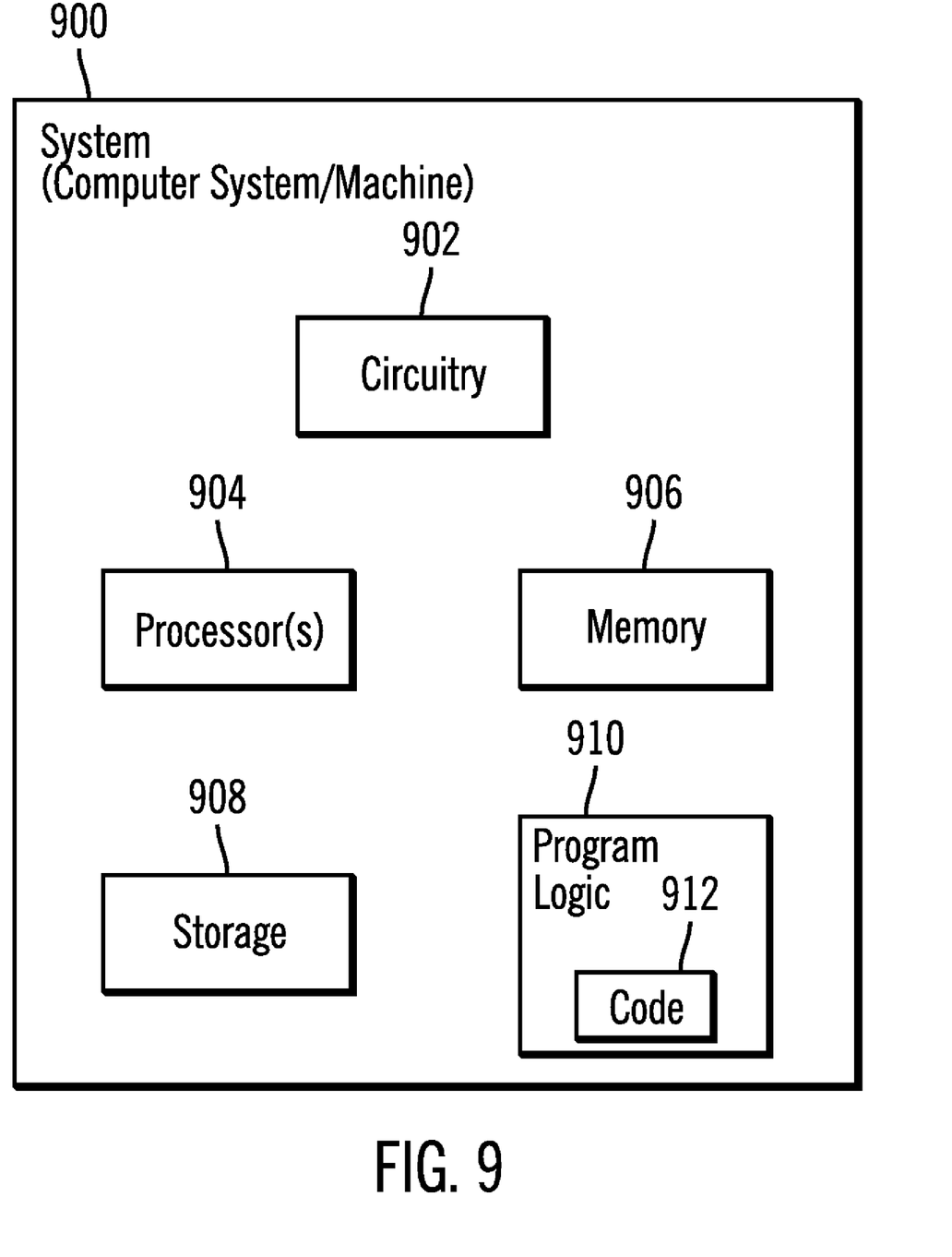
FIG. 9 illustrates the architecture of computing system, wherein in certain embodiments elements of the computing environment of FIG. 1 may be implemented in accordance with the architecture of the computing system.

FIG. 9 illustrates an exemplary computer system 900, wherein in certain embodiments the computing system 102 of the computing environment 100 of FIG. 1 may be implemented in accordance with the computer architecture of the computer system 900. The computer system 900 may also be referred to as a system, and may include a circuitry 902 that may in certain embodiments include a processor 904. The system 900 may also include a memory 906 (e.g., a volatile memory device), and storage 908. Certain elements of the system 900 may or may not be found in the computing system 102 of FIG. 1. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed towards a method for deploying computing infrastructure by a person or via automated processing. Certain other embodiments may be directed towards integrating computer-readable code into a computing system, wherein the code in combination with the computing system is enabled to perform the operations described earlier.

At least certain of the operations illustrated in FIG. 4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-9 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method for generating target code compliant with a platform, the method comprising:
    maintaining a rules file, wherein the rules file includes macro definitions and production rules that are implemented via macros, wherein the macros in response to being evaluated by a make utility direct execution of commands that result in generation of the target code compliant with the platform;
    maintaining at least one makefile, wherein the at least one makefile is platform-independent and does not include any directive pertaining to the platform, wherein the at least one makefile includes the rules file via include directives, wherein the rules file incorporates platform-specific software production directives, and wherein the at least one makefile in response to being interpreted by the make utility generates the target code compliant with the platform;
    initiating an execution of the make utility for interpreting the at least one makefile to generate the target code;
    evaluating at least one production rule expressed in at least one macro included in the rules file, in response to initiating the execution of the make utility; and
    generating the target code compliant with the platform, wherein different results are produced by different settings to the same variable in different makefiles if the same rules file is included in the different makefiles, wherein each makefile of a plurality of makefiles is included in a separate directory, wherein the rules file includes settings for at least two different operating systems, wherein based on the settings of the rules file and the settings of each makefile, each makefile when executed via the make utility generates a component or instance of a software product compliant with a desired operating system, and wherein a modification of the rules file does not change any content of the makefile.

2. The method of claim 1, wherein the at least one makefile is a first makefile, wherein a second makefile also includes the rules file, wherein at least one variable is included in a definition of the at least one macro in the rules file, the method further comprising:
    setting a first value to the at least one variable in the first makefile; and
    setting a second value to the at least one variable in a second makefile, wherein invocations of the make utility on the first and the second makefiles result in different executions.

3. The method of claim 1, further comprising:
    subsequent to generating the target code, determining that a selected command needs to be changed for generating the target code;
    determining the selected command that needs to be changed in a selected production rule included in the rules file;
    modifying the selected production rule in the rules file while leaving the at least one makefile unchanged; and
    in response to modifying the selected production rule, initiating a new execution of the make utility on the at least one makefile to generate the target code.

4. The method of claim 3, wherein an existing makefile that includes platform-specific steps is replaced by a new makefile that includes the rules file but does not include any platform-specific directives.

5. A system for generating target code compliant with a platform, the system comprising:
    memory; and
    processor coupled to the memory, wherein the processor performs operations, the operations comprising:
    maintaining a rules file, wherein the rules file includes macro definitions and production rules that are implemented via macros, wherein the macros in response to being evaluated by a make utility direct execution of commands that result in generation of the target code compliant with the platform;
    maintaining at least one makefile, wherein the at least one makefile is platform-independent and does not include any directive pertaining to the platform, wherein the at least one makefile includes the rules file via include directives, wherein the rules file incorporates platform-specific software production directives, and wherein the at least one makefile in response to being interpreted by the make utility generates the target code compliant with the platform;

initiating an execution of the make utility for interpreting the at least one makefile to generate the target code;

evaluating at least one production rule expressed in at least one macro included in the rules file, in response to initiating the execution of the make utility; and generating the target code compliant with the platform, wherein different results are produced by different settings to the same variable in different makefiles if the same rules file is included in the different makefiles, wherein each makefile of a plurality of makefiles is included in a separate directory, wherein the rules file includes settings for at least two different operating systems, wherein based on the settings of the rules file and the settings of each makefile, each makefile when executed via the make utility generates a component or instance of a software product compliant with a desired operating system, and wherein a modification of the rules file does not change any content of the makefile.

6. The system of claim 5, wherein the at least one makefile is a first makefile, wherein a second makefile also includes the rules file, wherein at least one variable is included in a definition of the at least one macro in the rules file, the operations further comprising:

setting a first value to the at least one variable in the first makefile; and setting a second value to the at least one variable in a second makefile, wherein invocations of the make utility on the first and the second makefiles result in different executions.

7. The system of claim 5, the operations further comprising:

subsequent to generating the target code, determining that a selected command needs to be changed for generating the target code;

determining the selected command that needs to be changed in a selected production rule included in the rules file;

modifying the selected production rule in the rules file while leaving the at least one makefile unchanged; and in response to modifying the selected production rule, initiating a new execution of the make utility on the at least one makefile to generate the target code.

8. The system of claim 7, wherein an existing makefile that includes platform-specific steps is replaced by a new makefile that includes the rules file but does not include any platform-specific directives.

9. A computer readable storage medium for generating target code compliant with a platform, wherein machine readable instructions are stored in the computer readable storage medium, and wherein the machine readable instructions cause operations on a computer, the operations comprising:

maintaining a rules file, wherein the rules file includes macro definitions and production rules that are implemented via macros, wherein the macros in response to being evaluated by a make utility direct execution of commands that result in generation of the target code compliant with the platform;

maintaining at least one makefile, wherein the at least one makefile is platform-independent and does not include any directive pertaining to the platform, wherein the at least one makefile includes the rules file via include directives, wherein the rules file incorporates platform-specific software production directives, and wherein the at least one makefile in response to being interpreted by the make utility generates the target code compliant with the platform;

initiating an execution of the make utility for interpreting the at least one makefile to generate the target code;

evaluating at least one production rule expressed in at least one macro included in the rules file, in response to initiating the execution of the make utility; and generating the target code compliant with the platform, wherein different results are produced by different settings to the same variable in different makefiles if the same rules file is included in the different makefiles, wherein each makefile of a plurality of makefiles is included in a separate directory, wherein the rules file includes settings for at least two different operating systems, wherein based on the settings of the rules file and the settings of each makefile, each makefile when executed via the make utility generates a component or instance of a software product compliant with a desired operating system, and wherein a modification of the rules file does not change any content of the makefile.

10. The computer readable storage medium of claim 9, wherein the at least one makefile is a first makefile, wherein a second makefile also includes the rules file, wherein at least one variable is included in a definition of the at least one macro in the rules file, the operations further comprising:

setting a first value to the at least one variable in the first makefile; and setting a second value to the at least one variable in a second makefile, wherein invocations of the make utility on the first and the second makefiles result in different executions.

11. The computer readable storage medium of claim 9, the operations further comprising:

subsequent to generating the target code, determining that a selected command needs to be changed for generating the target code;

determining the selected command that needs to be changed in a selected production rule included in the rules file;

modifying the selected production rule in the rules file while leaving the at least one makefile unchanged; and in response to modifying the selected production rule, initiating a new execution of the make utility on the at least one makefile to generate the target code.

12. The computer readable storage medium of claim 11, wherein an existing makefile that includes platform-specific steps is replaced by a new makefile that includes the rules file but does not include any platform-specific directives.

13. A method for deploying computing infrastructure for generating target code compliant with a platform, comprising integrating computer-readable code into a computer, wherein the code in combination with the computer is capable of performing:

maintaining a rules file, wherein the rules file includes macro definitions and production rules that are implemented via macros, wherein the macros in response to being evaluated by a make utility direct execution of commands that result in generation of the target code compliant with the platform;

maintaining at least one makefile, wherein the at least one makefile is platform-independent and does not include any directive pertaining to the platform, wherein the at least one makefile includes the rules file via include directives, wherein the rules file incorporates platform-specific software production directives, and wherein the at least one makefile in response to being interpreted by the make utility generates the target code compliant with the platform;

initiating an execution of the make utility for interpreting the at least one makefile to generate the target code;

evaluating at least one production rule expressed in at least one macro included in the rules file, in response to initiating the execution of the make utility; and generating the target code compliant with the platform, wherein different results are produced by different settings to the same variable in different makefiles if the same rules file is included in the different makefiles, wherein each makefile of a plurality of makefiles is included in a separate directory, wherein the rules file includes settings for at least two different operating systems, wherein based on the settings of the rules file and the settings of each makefile, each makefile when executed via the make utility generates a component or instance of a software product compliant with a desired operating system, and wherein a modification of the rules file does not change any content of the makefile.

14. The method for deploying computing infrastructure of claim 13, wherein the at least one makefile is a first makefile, wherein a second makefile also includes the rules file, wherein at least one variable is included in a definition of the at least one macro in the rules file, wherein the code in combination with the computer is further capable of performing:
  setting a first value to the at least one variable in the first makefile; and
  setting a second value to the at least one variable in a second makefile, wherein invocations of the make utility on the first and the second makefiles result in different executions.

15. The method for deploying computing infrastructure of claim 13, wherein the code in combination with the computer is further capable of performing:
  subsequent to generating the target code, determining that a selected command needs to be changed for generating the target code;
  determining the selected command that needs to be changed in a selected production rule included in the rules file;
  modifying the selected production rule in the rules file while leaving the at least one makefile unchanged; and
  in response to modifying the selected production rule, initiating a new execution of the make utility on the at least one makefile to generate the target code.

16. The method for deploying computing infrastructure of claim 15, wherein an existing makefile that includes platform-specific steps is replaced by a new makefile that includes the rules file but does not include any platform-specific directives.

* * * * *